2,946,806

PROCESS FOR THE PRODUCTION OF PENTA-CHLOROPHENYL ETHERS OF POLYHYDRIC ALCOHOLS

Joachim Nentwig, Krefeld, and Hermann Schnell, Krefeld-Uerdingen, Germany, assignors to Farbenfabriken Bayer Aktiengesellschaft, Leverkusen, Germany, a corporation of Germany No Drawing. Filed May 22, 1957, Ser. No. 660,766

Claims priority, application Germany May 26, 1956

7 Claims. (Cl. 260—340.7)

It is known to produce pentachlorophenyl ethers of monohydric aliphatic alcohols by reaction of hexachlorobenzene with these alcohols in the presence of acid-binding agents, particularly caustic alkalies.

When this reaction is applied to polyhydric alcohols, especially those containing more than two hydroxyl groups, for example glycerol, trimethylolpropane or pentaerythritol, there are obtained at temperatures up to about 130° C., usually applied for the production of pentachlorophenyl ethers of monohydric alcohols, undefined mixtures of mono- and polyethers of polyhydric alcohols generally in very unsatisfactory yields. The application of higher temperatures, for example of 150 to 200° C., leads in some cases, due to the instability of the polyhydric alcohols in the strongly alkaline medium, to highly contaminated products also obtained in very unsatisfactory yields. In other cases, for example with glycerol, no reaction of the polyhydric alcohol with the hexachlorobenzene practically takes place and pentachlorophenol is essentially formed.

It has now been found that well-defined pentachlorophenyl ethers of polyhydric alcohols may be obtained in a technically advantageous manner by reacting acetals or ketals of polyhydric alcohols containing at least one free hydroxyl group, with hexachlorobenzene in the presence of acid-binding agents. It is surprising that this reaction proceeds so rapidly by heating at temperatures between about 80° C. and about 250° C. and particularly up to 150° C. that the acetals or ketals of polyhydric alcohols do not decompose. Particularly very good yields of pentachlorophenyl monoethers are obtained when starting from monoacetals or -ketals of trihydric alcohols. Moreover, the process according to the invention enables a number of technically valuable compounds not hitherto obtainable to be produced.

Polyhydric alcohols which may be used according to the invention are for example, trihydric alcohols such as glycerol, trimethylolethane, trimethylolpropane, and trimethylolbutane, furthermore pentaerythritol and sorbitol.

For producing the acetals or ketals of the aforesaid polyhydric alcohols there may be used lower oxocompounds that is to say lower aldehydes or ketones such as formaldehyde, acetaldehyde, benzaldehyde, acetone, methylethyl ketone or cyclohexanone. The acetal- or ketal-formation is effected according to known methods, for example by heating the mixture of the components in the presence of small quantities of iodine or acid catalysts and separation of the reaction water formed, for example by azeotropic distillation.

As acid-binding agents there may be used metal oxides, hydroxides or carbonates, for example calcium oxide, magnesium oxide, sodium hydroxide, potassium hydroxide, calcium hydroxide, sodium carbonate, sodium bicarbonate or potassium carbonate.

The reaction of the acetals or ketals of the polyhydric alcohols of the class mentioned above with hexachlorobenzene according to the invention may be carried out in inert solvents, preferably such as benzene, toluene, xylene, dioxane, and pyridine, furthermore monochlorobenzene, o-dichlorobenzene, chloronaphthalene, tetrahydronaphthalene and decahydronaphthalene.

It is advantageous to select as reaction temperature the boiling point of the inert solvent employed, thus enabling the reaction water formed to be removed by azeotropic distillation. In some cases, the removing of the water may be advanced by running an inert gas stream through the reaction mixture.

The pentachlorophenyl ethers of the acetals or ketals of polyhydric alcohols may be isolated in conventional manner from the reaction solution or immediately worked up without isolation.

The pentachlorophenyl ethers of the acetals or ketals of polyhydric alcohols may, for example, be converted as such into polyesters by heating it with polybasic carboxylic acids especially dicarboxylic acids such as adipic acid, sebacic acid, maleic acid, phthalic acid and tetrachlorophthalic acid, with splitting off of the aldehyde or ketone and water. This process for manufacturing polyesters from the acetals or ketals mentioned above corresponds to the process well known in the art when starting from dihydric alcohols.

The pentachlorophenyl ethers of the acetals or ketals of polyhydric alcohols may also be converted into the pentachlorophenyl ethers of polyhydric alcohols with at least two free hydroxyl groups by saponification through methods known in the art per se, for example by treatment with steam in the presence of small quantities of acid, and the products thus obtained may be used for the synthesis of plastics by methods well known in the art per se, for example by heating it with dicarboxylic acids such as adipic acid, sebacic acid, maleic acid, phthalic acid and tetrachlorophthalic acid. They impart in this way useful properties to the plastics which in particular become less inflammable.

In the following, a number of new products may be mentioned which are obtainable according to the process described above:

From 2,2-dimethyl-5-ethyl - 5 - methylol - 1,3 - dioxane there is obtained by reaction with hexachlorobenzene: 2,2 - dimethyl-5-ethyl-5-pentachlorophenoxymethyl - 1,3-dioxane and from the latter by saponification the trimethylolpropane-monopentachlorophenyl ether.

From 2-methyl-5-ethyl-5-methylol-1,3-dioxane: the 2-methyl-5-ethyl-5-pentachlorophenoxymethyl-1,3-dioxane.

From 2-phenyl-5-ethyl-5-methylol-1,3-dioxane: the 2-phenyl-5-ethyl-5-pentachlorophenoxy-methyl-1,3-dioxane.

From 2,2 - pentamethylene-5-ethyl-5-methylol-1,3-dioxane: the 2,2 - pentamethylene-5-ethyl-5-pentachlorophenoxymethyl-1,3-dioxane.

From 2,2-pentamethylene-5-methylol-1,3-dioxolane: the 2,2 - pentamethylene - 5 - pentachlorophenoxymethyl-1,3-dioxolane and therefrom by saponification the glycerol-monopentachlorophenyl ether.

From 2,2-dimethyl-5-methylol-1,3-dioxolane: the 2,2-dimethyl-5-pentachlorophenoxymethyl-1,3-dioxolane.

An especially advantageous method of carrying out the process in practice consists in that the polyhydric alcohol is acetalised or ketalised in known manner per se prior to its reaction with hexachlorobenzene, by heating with an acetal or ketal of the pentachlorophenyl ether obtained from the same polyalcohol in the presence of catalysts, the acetal or ketal of the polyhydric alcohol thus obtained reacted with hexachlorobenzene in the presence of acid-binding agents, the acetal or ketal of the pentachlorophenyl ether thus obtained heated again with the same polyalcohol and continuing the reaction in this way.

It is known to split acetals or ketals by reaction with alcohols in the presence of catalysts. It was, however, not to be expected that the reaction of acetals or ketals of pentachlorophenyl ethers of polyhydric alcohols with these polyhydric alcohols takes place in almost quantitative yields in regard to the polyalcohols as well as to the pentachlorophenyl ethers.

The reaction of the acetals or ketals of the pentachlorophenyl ethers of the aforesaid class with the corresponding polyalcohols is effected by simply heating the two reaction components with each other. Suitable temperatures are, generally, between about 120 to 200° C. The temperature is preferably so that the acetal or ketal of the polyhydric alcohol formed in the reaction is continuously distilled off.

Inert diluents such as decahydronaphthalene, tetrahydronaphthalene, chlorobenzene, chloronaphthalene or diphenyl ether may also be added.

In general, it is advantageous to heat first the acetal or ketal of the pentachlorophenyl ether to the reaction temperature, and to add the polyalcohol ether in small portions or continuously as and when it reacts with the acetal or ketal.

Suitable catalysts for the inter-acetalisation or interketalisation are, for example, acids such as ortho-phosphoric acid, p-toluene-sulphonic acid, sulphuric acid, hydrochloric acid, acid salts such as potassium bisulphate or acid phosphates, further highly dispersed substances such as highly dispersed alumina, or acid ion-interchangers such as obtainable, for example, by sulphonation of cross-linked polystyrene.

In the reaction of the acetals or ketals of the pentachlorophenyl ethers with polyalcohols, the acetals or ketals of polyalcohols thus formed are continuously removed by distillation. Very pure products are thus obtained. The pentachlorophenyl ethers of the free alcohols contained in the residue may be purified by conventional methods, for example by fractional distillation or by recrystallisation.

The following examples are given for the purpose of illustrating the invention.

Example 1

A mixture of 107 grams (0.5 mole) of 2,2-pentamethylene-5-ethyl-5-methylol-1,3-dioxane, 28 grams (0.5 mole) of potassium hydroxide, 135 grams (0.475 mole) of hexachlorobenzene and 500 millilitres of a xylene mixture is heated with stirring using a water separator. The splitting off of water is completed after one hour. The mixture is heated for a further 2 hours and treated upon cooling with 200 millilitres of water. After separation of the aqueous layer containing potassium chloride, the xylene solution is dried with sodium sulphate, filtered and evaporated to dryness. 233 grams of raw 2,2-pentamethylene-5-ethyl-5-pentachlorophenoxymethyl-1,3-dioxane is thus obtained as an almost colourless crystal mass. The yield of the raw product is 97 percent of the theoretical referred to hexachlorobenzene.

The raw 2,2-pentamethylene-5-ethyl-5-pentachlorophenoxymethyl-1,3-dioxane can be purified by distillation under vacuum, or by recrystallisation from alcohol or ethyl acetate, or from a mixture of these solvents at a ratio of 1:1. B.P. 250–260° C./0.8 mm. mercury gauge. Melting point 113–114° C.

Analysis.—$C_{18}H_{21}O_3Cl_5$ (molecular weight 462.5): Calculated, C, 46.7; H, 4.53; O, 10.38; Cl, 38.4. Found, C, 47.03; H, 4.55; O, 10.63; Cl, 38.6%.

For saponification of the 2,2-pentamethylene-5-ethyl-5-pentachlorophenoxymethyl-1,3-dioxane, 46 grams (0.1 mole) of the product are treated with 200 millilitres of water and 1 millilitre of concentrated sulphuric acid, and then with steam for 3½ hours. 9 grams (theoretically 9.8 grams) of cyclohexanone can be detected in the distillate. The residue forming a colourless greasy mass which crystallises upon rubbing with ethyl acetate, is the raw tripropane-monopentachlorophenyl ether.

Analysis.—$C_{12}H_{13}O_3Cl_5$ (molecular weight 382.5): Calculated, hydroxyl value, 292. Found, hydroxyl value, 183.

The product can be purified by recrystallisation from ethyl acetate, benzene or toluene and melts at 112–115° C.

Example 2

360 grams of 2-methyl-5-ethyl-5-methylol-1,3-dioxane (2 moles) are heated to boiling in a three-necked flask provided with stirrer, thermometer and water separator, with 626 grams of hexachlorobenzene (2.2 moles) 88 grams of sodium hydroxide (2.2 moles), 600 grams of a xylene mixture and 100 grams of pyridine. 49 millilitres of water, containing about 10 grams of pyridine, are split off in the course of 5½ hours. After cooling to about 50° C. the sodium chloride formed and the excess of hexachlorobenenze are filtered off and the filtrate is freed from xylene by distillation. The residue is distilled under water-jet vacuo.

As first runnings 89 grams of a mixture of hexachlorobenzene and 2 - methyl-5-ethyl-5-pentachlorophenoxymethyl 1,3-dioxane, containing 57 grams of 2-methyl-5-ethyl-5-methylol-1,3-dioxane=7 percent of the theoretical, are obtained. The mixture is subsequently further distilled under an oil-pump vacuo. As main runnings (B.P. 185–195° C. under 0.2 mm. mercury gauge) there are obtained 534 grams of 2-methyl-5-ethyl-5-pentachlorophenoxymethyl-1,3-dioxane=65 percent of the theoretical.

The last runnings are 59 grams (B.P. 195–225° C./0.2–0.4 mm. mercury gauge), consisting of somewhat more impure 2 - methyl-5-ethyl-5-pentachlorophenoxymethyl-1,3-dioxane=7 percent of the theoretical.

The total yield of 2-methyl-5-ethyl-5-pentachlorophenoxymethyl-1,3-dioxane is about 79 percent of the theoretical.

Analysis:

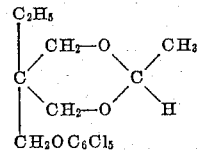

$C_{14}H_{15}O_3Cl_5$ (molecular weight 408.5): Calculated, C, 41.2; H, 3.67; O, 11.73; Cl, 43.4%. Found, C, 41.41; H, 3.77; O, 11.70; Cl, 42.4%.

The 2-methyl-5-ethyl-5-pentachlorophenoxymethyl-1,3-dioxane may be converted to trimethylolpropane-monopentachlorophenyl ether according to the process described in Example 1.

Example 3

845 grams (2 moles) of 2,2-dimethyl-5-ethyl-5-pentachlorophenoxymethyl-1,3-dioxane are melted in a three-necked flask provided with stirrer, dropping funnel, thermometer and a 30 cm.-column with descending condenser, and treated with 2 grams of orthophosphoric acid. A water-jet vacuum is applied and into the melt there are introduced dropwise at a temperature of the sump of 180° C. within 75 minutes 295 grams of trimethylolpropane (10 percent excess). 2,2-dimethyl-5-ethyl-5-methylol-1,3-dioxane distils off. After addition of the trimethylolpropane is completed, the temperature is maintained at 200° C. for a further 30 minutes.

328 grams of 2,2-dimethyl-5-ethyl-5-methylol-1,3-dioxane (94 percent of the theoretical) are obtained as distillate.

The residue of 792 grams remaining in the reaction flask is distilled in an oil pump vacuum. There are obtained:

First runnings—47 grams (B.P. 130–215° C./0.2 mm. mercury gauge) containing trimethyllolpropane, 2,2-dimethyl-5-ethyl-5-methylol-1,3-dioxane and trimethylolpropane-monopentachlorophenyl ether.

Main runnings—627 grams (B.P. 215–220° C./0.2 mm. mercury gauge) of trimethylolpropane-monopentachlorophenyl ether (melting point 114–116° C.), 82 percent of the theoretical.

Last runnings— 61 grams (B.P. 220–235° C./0.2 mm. mercury gauge) consisting of somewhat more impure trimethylolpropane-monopentachlorophenyl ether (melting point 110–115° C.), 8 percent of the theoretical.

Residue—44 grams of a resin-like product.

The total yield of trimethylolpropane-monopentachlorophenyl ether is about 90 percent of the theoretical.

The distillate first obtained containing 328 grams of 2,2-dimethyl-5-ethyl-5-methylol-1,3-dioxane (1.89 moles) is heated to the boil in a three-necked flask provided with stirrer, thermometer and water separator, with 568 grams of hexachlorobenzene (2 moles), 80 grams of sodium hydroxide and 600 millilitres of a xylene mixture. 35 millilitres of water are split off in the course of 4 hours.

After cooling, the common salt formed and the excess of hexachlorobenzene are filtered off and the filtrate is freed from xylene by distillation. The residue is distilled under water-jet vacuum. As first runnings 82 grams of a mixture of hexachlorobenzene and 2,2-dimethyl-5-ethyl-5-pentachlorophenoxymethyl - 1,3-dioxane are obtained. The mixture is subsequently further distilled under an oil pump vacuum. As main runnings there are obtained 545 grams (68 percent of the theoretical) of 2,2 - dimethyl-5-ethyl-5-pentachlorophenoxymethyl-1,3-dioxane, B.P. 196–200° C./0.4–0.5 mm. mercury gauge, melting point 89–93° C. The product thus obtained may be further worked up with trimethylolpropane as described above. Distillation residue 142 grams.

*Analysis.*—2,2-dimethyl-5-ethyl-5-pentachlorophenoxymethyl - 1,3 - dioxane, $C_{15}H_{17}O_3Cl_5$ (molecular weight 422.5): Calculated, C, 42.6; H, 4.03; O, 11.36; Cl, 42.0%. Found, C, 42.81; H, 4.10; O, 10.43; Cl, 42.1%.

The reactions proceed according to the following scheme:

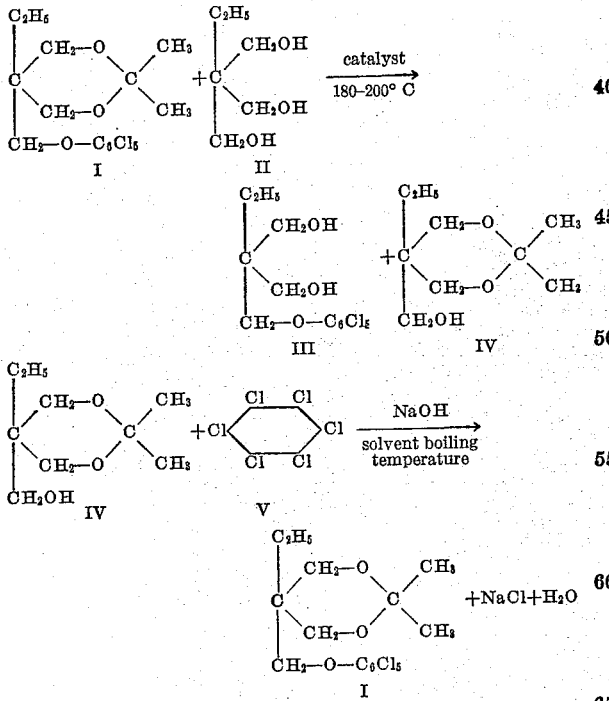

As described for 2,2-alkyl-5-ethyl-5-methylol-1,3-dioxane in the three foregoing examples the reactions with the corresponding methyl and propyl derivatives are homologous.

*Example 4*

456 grams (1.2 moles) of 2,2-dimethyl-5-pentachlorophenoxymethyl-1,3-dioxolane are heated to 170° C. with 110 grams (1.2 moles) of glycerol and 12 grams of highly dispersed alumina (pH 2–3) in a three-necked flask provided with stirrer, thermometer and a small column with descending condenser under a water-jet vacuum. 146 grams of 2,2-dimethyl-5-methylol-1,3-dioxolane (92 percent of the theoretical) are distilled off in the course of 2 hours. The residue is treated with 400 millilitres of alcohol, filtered and after evaporation of the alcohol distilled under an oil pump vacuum. 321 grams of glycerol-monopentachlorophenyl ether, B.P. 190–205° C./0.4–0.5 mm. mercury gauge, are obtained as main runnings (hydroxyl value: calculated, 330; found, 340). The yield corresponds to 79 percent of the theoretical.

The distillate first obtained, 146 grams (1.1 mole) of 2,2-dimethyl-5-methylol-1,3-dioxolane, is heated in a three-necked flask provided with stirrer, thermometer and water separator, together with 568 grams (2 moles) of hexachlorobenzene, 62 grams (1.1 moles) of potassium hydroxide and 600 millilitres of toluene. 26 millilitres of water are split off in the course of 2½ hours. The mixture is filtered off with suction and in this manner excess hexachlorobenzene and the potassium chloride formed in the reaction are removed. The filtrate is worked up by distillation in the manner described in Example 1. As main running, 256 grams (66 percent of the theoretical) of 2,2 - dimethyl - 5 - pentachlorophenoxymethyl-1,3-dioxolane are obtained. B.P. 180–195° C./0.2–0.4 mm. mercury gauge. The product can be further worked up with glycerol as described above.

*Analysis.*—2,2 - dimethyl-5-pentachlorophenoxymethyl-1,3-dioxolane, $C_{12}H_{11}O_3Cl_5$ (molecular weight 380.5): Calculated, Cl, 46.6%; O, 12.6%. Found, Cl, 46.0%; O, 12.34%.

The reactions proceed according to the following scheme:

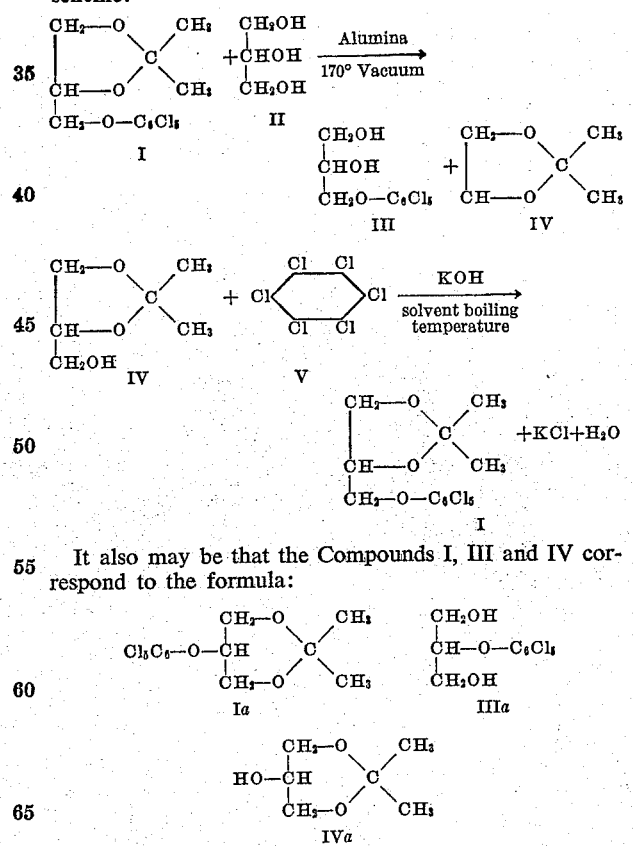

It also may be that the Compounds I, III and IV correspond to the formula:

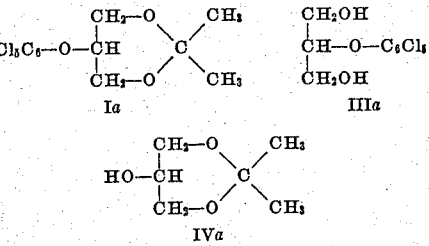

but this is not critical for the invention.

We claim:

1. 2,2 - dimethyl-5-ethyl-5-pentachlorophenoxymethyl-1,3-dioxane.
2. 2-methyl-5-ethyl-5-pentachlorophenoxymethyl-1,3-dioxane.
3. 2,2 - pentamethylene-5-ethyl-5-pentachlorophenoxymethyl-1,3-dioxane.

4. 2,2 - dimethyl-5-pentachlorophenoxymethyl-1,3-dioxolane.

5. The process according to claim 6, wherein the reaction is carried out in the presence of a solvent selected from the group consisting of benzene, toluene, xylene, dioxane and pyridine.

6. The process for the production of monopentachlorophenylethers which comprises reacting at temperatures from about 80° C. to about 250° C. (1) a member selected from the group consisting of acetals and ketals derived from the reaction of a trihydric alcohol selected from the group consisting of glycerol, trimethylol ethane, trimethylolpropane and trimethylolbutane with a hydrocarbon mono-oxo compound wherein the hydrocarbon radical contains up to seven carbon atoms, with (2) hexachlorobenzene, and (3) an acid binding agent selected from the group consisting of alkali metal and alkaline earth metal oxides, hydroxides and carbonates.

7. Monopentachlorophenylethers formed by reacting at temperatures from about 80° C. to about 250 C. (1) a member selected from the group consisting of acetals and ketals derived from the reaction of a trihydric alcohol selected from the group consisting of glycerol, trimethylol ethane, trimethylolpropane and trimethylolbutane with a hydrocarbon mono-oxo compound selected from the group consisting of formaldehyde, acetaldehyde, benzaldehyde, acetone, methylethylketone and cyclohexanone, with (2) hexachlorobenzene and (3) an acid binding agent selected from the group consisting of alkali metal and alkaline earth metal oxides, hydroxides and carbonates.

References Cited in the file of this patent

UNITED STATES PATENTS

| | | |
|---|---|---|
| 2,296,375 | Arundale | Sept. 22, 1942 |
| 2,331,614 | Marple | Oct. 12, 1943 |
| 2,416,263 | MacMullen | Feb. 18, 1947 |
| 2,446,464 | Evans et al. | Aug. 3, 1948 |
| 2,553,555 | Drake | May 22, 1951 |

FOREIGN PATENTS

| | | |
|---|---|---|
| 314,326 | Switzerland | July 31, 1956 |

OTHER REFERENCES

C. J. Weinman et al.: J. Econ. Entomol., vol. 40, pp. 74-8, 1947. C.A. 41: 4885g.